(12) United States Patent
Salabai (10) Patent No.: US 11,283,229 B2
(45) Date of Patent: Mar. 22, 2022

(54) SOCKET DEVICE FOR A MOTOR VEHICLE AND MOTOR VEHICLE COMPRISING A SOCKET DEVICE

(71) Applicant: Volkswagen Aktiengesellschaft, Wolfsburg (DE)

(72) Inventor: Anton Salabai, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/970,267

(22) PCT Filed: Jan. 11, 2019

(86) PCT No.: PCT/EP2019/050667
§ 371 (c)(1),
(2) Date: Aug. 14, 2020

(87) PCT Pub. No.: WO2019/158284
PCT Pub. Date: Aug. 22, 2019

(65) Prior Publication Data
US 2021/0143598 A1   May 13, 2021

(30) Foreign Application Priority Data
Feb. 15, 2018   (DE) ................... 10 2018 202 342.5

(51) Int. Cl.
*H01R 35/04* (2006.01)
*B60R 16/02* (2006.01)
*H01R 24/78* (2011.01)

(52) U.S. Cl.
CPC ............. *H01R 35/04* (2013.01); *B60R 16/02* (2013.01); *H01R 24/78* (2013.01); *H01R 2201/26* (2013.01)

(58) Field of Classification Search
CPC .... H01R 35/04; H01R 24/78; H01R 2201/26; B60R 16/02
See application file for complete search history.

(56) References Cited

U.S. PATENT DOCUMENTS 7,258,555 B2    8/2007   Tiesler et al. ................. 439/121
7,407,392 B2 *  8/2008   Cooke .................... A47B 21/06
                                                            108/62
(Continued)

FOREIGN PATENT DOCUMENTS

DE         20108966 U1     9/2001   .............. E04B 2/74
DE      102006011946 A1    9/2006   ............. H01R 25/14
(Continued)

OTHER PUBLICATIONS

German Office Action, Application No. 102018202342.5, 4 pages, dated Dec. 17, 2018.
(Continued)

*Primary Examiner* — Tho D Ta
(74) *Attorney, Agent, or Firm* — Slayden Grubert Beard PLLC (57) ABSTRACT

The invention relates to a socket device for a motor vehicle and to a motor vehicle comprising a socket device. The socket device comprises a housing in which a socket for receiving a plug is arranged. The socket device comprises a mount, by means of which the housing can be mounted at least indirectly on a separating wall of the motor vehicle so as to be able to rotate about an axis of rotation, such that the socket is accessible from both sides of the separating wall by means of a corresponding rotation of the housing.

15 Claims, 6 Drawing Sheets

(56) References Cited

U.S. PATENT DOCUMENTS

| | | | |
|---|---|---|---|
| 8,277,233 B2* | 10/2012 | Su | H01R 31/06 |
| | | | 439/131 |
| 9,257,799 B2* | 2/2016 | Stubbs | B60K 35/00 |
| 2004/0217615 A1 | 11/2004 | Lindstrom et al. | 296/24.34 |
| 2009/0233481 A1 | 9/2009 | Messerschmid et al. | 439/562 |
| 2014/0057488 A1* | 2/2014 | Hsu | H01R 13/6675 |
| | | | 439/534 |

FOREIGN PATENT DOCUMENTS

| | | | | |
|---|---|---|---|---|
| DE | 102005037486 A1 | 2/2007 | | B60Q 1/26 |
| DE | 10260502 B4 | 3/2011 | | B60N 2/75 |
| DE | 102012022101 A1 | 5/2013 | | B60L 11/18 |
| DE | 102012008647 A1 | 11/2013 | | A47G 29/087 |
| DE | 102013209529 A1 | 11/2014 | | H01R 11/30 |
| DE | 202015102641 U1 | 9/2015 | | B60R 16/02 |
| DE | 102018202342 A1 | 8/2019 | | H01R 13/73 |
| EP | 1679232 A1 | 7/2006 | | B60R 11/02 |
| GB | 2489038 A | 9/2012 | | B60R 16/02 |
| WO | 2019/158284 A1 | 8/2019 | | B60R 16/02 |

OTHER PUBLICATIONS

International Search Report and Written Opinion, Application No. PCT/EP2019/050667, 8 pages, dated Apr. 12, 2019.

* cited by examiner

SOCKET DEVICE FOR A MOTOR VEHICLE AND MOTOR VEHICLE COMPRISING A SOCKET DEVICE

CROSS-REFERENCE TO RELATED APPLICATIONS

This application claims priority to German Patent Application No. DE 10 2018 202 342.5, filed on Feb. 15, 2018 with the German Patent and Trademark Office. The contents of the aforesaid Patent Application are incorporated herein for all purposes.

TECHNICAL FIELD

The invention relates to a socket device for a motor vehicle and to a motor vehicle comprising a socket device of this kind.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The constantly growing demand for interfaces in motor vehicles for electrical devices that are operated at a typical mains voltage of, for example, 120 volts or 230 volts requires the installation of DC/AC voltage transformers and accommodating the associated socket in the motor vehicle. In passenger cars, a socket of this kind may be found in the dashboard, center console, or trunk of the motor vehicle.

SUMMARY

Commercial vehicles may be unique in that they may be spatially divided into two vehicle regions, i.e., a cargo space and a passenger space, that are firmly enclosed on all sides. These two vehicle regions may be separated from one another by means of a separating wall. In commercial vehicles, the usage scenarios and the devices used may vary depending on the purpose and position of the socket. Whereas a socket in the passenger space may be used for charging multimedia devices, in the cargo space they may be used for operating or charging electrically powered tools. In order to be able to cover the entire usage spectrum of sockets in a motor vehicle, a mains voltage interface would be beneficial in the passenger space and also in the cargo space.

An object of the invention is to provide a system for a motor vehicle by means of which a socket can be provided in two separate motor vehicle regions in a technically particularly simple manner.

The object is solved by a socket device for a motor vehicle as claimed. Embodiments of the invention are discussed in the dependent claims and the following description.

DETAILED DESCRIPTION

According to a first exemplary aspect, a socket device comprises a socket arranged in a housing for receiving a plug. The socket device comprises a mount, by means of which the housing can be mounted at least indirectly on a separating wall of the motor vehicle so as to be able to rotate about an axis of rotation, such that the socket is accessible from both sides of the separating wall by means of a corresponding rotation of the housing. The present aspect therefore proposes an electrical plug connection arranged in a casing for establishing contact between a power cable and an electrical device by means of a plug. This casing, i.e., the housing, in which the socket is arranged can be moved about an axis of rotation. The rotational movement is provided by means of a corresponding machine element, namely a mount. This mount may be arranged, either indirectly via intermediate links or directly, on a wall in the motor vehicle that separates two regions of the motor vehicle from one another. The housing comprising the socket can therefore be rotated about the axis of rotation by means of the mount such that it is possible, by means of a corresponding rotational movement, to use the socket in the corresponding one of two regions of the motor vehicle.

A socket device of this kind may for example be fitted in a commercial vehicle comprising a separating wall that separates a passenger space and a cargo space from one another. By means of a corresponding rotation of the housing of the socket device, the socket can be used both in the passenger space and in the cargo space. In the passenger space, an electrical device, such as a mobile telephone or a tablet PC, may for example be charged by means of the socket of the socket device. In the cargo space region of the motor vehicle, the socket of the socket device may for example be used to charge or operate electrically powered tools.

As a result, in a particularly beneficial manner and also technically simple to implement, by virtue of the socket device for a motor vehicle, it is possible to provide a socket in a motor vehicle that can be used in two separate regions of the motor vehicle. The socket may also be used at any time in either of the two regions, since the socket comprises a permanent connection to a power source. Therefore, the socket device makes it possible to supply both spatially separated vehicle regions with electrical energy using a single socket, meaning that two separate sockets may not be required in the motor vehicle.

Alternatively and in some embodiments, instead of a socket arranged in a housing for receiving a plug, the socket device may simply comprise a socket without an additional housing. A mount is then directly arranged on the socket, by means of which the socket can be mounted at least indirectly on a separating wall of the motor vehicle so as to be able to rotate about an axis of rotation, such that the socket is accessible from both sides of the separating wall by means of a corresponding rotation of the socket.

In some embodiments, the socket is designed to provide an electrical voltage of 100, 115, 120, 127, 200, 220, 230 or 240 volts. Therefore, different country variants may be implemented by means of the socket device, depending on which mains voltage is supplied locally. In addition, the socket may be designed to be able to receive various types of plug. For example, sockets for receiving a plug of types A and B, such as those used for example in the USA, Canada or Mexico, type F, such as those used in most European countries, type G, such as those used for example in Great Britain, or type I, such as those used for example in Australia and New Zealand, are possible. Furthermore, the socket may be designed such that different mains frequencies, for example 50 or 60 Hertz, are possible. If sufficient power is supplied in the motor vehicle, the socket may also be designed to supply a three-phase alternating current with a nominal voltage of 400 V according to international standard IEC 60309 for "plugs, socket-outlets and couplers for industrial purposes". The socket device for a motor vehicle is therefore suitable for worldwide use of electrical devices in a motor vehicle.

In other embodiments, the housing can be rotated about the axis of rotation into at least two predetermined positions. By rotating the housing about the axis of rotation, the socket arranged in the housing may therefore be brought into at least two defined positions. These positions may be selected such that, in one position, the socket is accessible from the passenger space and, in the other second position, from the cargo space. As an alternative to the at least two predetermined positions of the housing, it is also possible for the housing to be arranged so as to be able to move continuously about the axis of rotation.

By virtue of predetermined positions of the housing in which the housing latches into place, for example by means of a corresponding hold mechanism, a particularly beneficial and simple switch between the at least two housing positions is possible. The housing of the socket device may therefore be rotated manually with relatively little effort such that the socket is accessible from the desired subregion of the motor vehicle.

In other embodiments, the housing may be rotated about the axis of rotation into a predetermined intermediate position, in which the socket is accessible from neither of the two sides of the separating wall. Therefore, in addition or as an alternative to the at least two predetermined positions of the housing, a third position is also provided. In this third position, the socket can neither be used from the passenger space nor from the cargo space, since the socket is arranged parallel to the separating wall in this intermediate position. This intermediate position may be selected if the socket does not have to be accessible from either of the two sides, since the socket is not currently being used. This produces the benefit that the socket is protected from dirt or objects moving around inside the motor vehicle during travel even without a protective cap integrated in the socket device.

In other embodiments, the housing is designed as a straight circular cylinder such that the axis of rotation of the housing extends in parallel with a lateral cylinder surface through respective center points of a top and base surface of the circular cylinder. The housing therefore has the shape of a circular cylinder. The circular surfaces at the top and bottom end of said cylinder are perpendicular to the axis about which the rotary cylinder rotates. The axis of rotation extends through the center points of said circular cylinder surfaces. In addition, the mount by means of which the housing can be rotated about the axis of rotation is arranged in the region of the center points of the cylinder surfaces. On account of this housing shape and positioning of the axis of rotation of the housing, a particularly beneficial socket device is provided, in particular with respect to the desired rotary movement of the housing.

In other embodiments, a predetermined circle segment having a predetermined circle arc and a predetermined circle chord was in each case cut out at two cylinder surfaces arranged in each case at a predetermined distance parallel to the top and base surface of the housing, such that the housing comprises a recess between the two cylinder surfaces, on which recess the socket is arranged in the housing. The socket is therefore arranged in a recess of the housing designed as a straight circular cylinder. This recess starts at a predetermined distance, i.e. at a predetermined spacing, from the two ends of the circular cylinder. Therefore, cylinder surfaces that at least partially constitute the housing wall in the region of the recess are arranged at a specific distance from and in parallel with the top and base surfaces of the circular cylinder that delimit the circular cylinder. These regions of the cylinder surfaces, which serve as a housing wall in the region of the recess, can be described as circle portions. In geometry, a circle portion is defined as covering a subarea of a circular surface that is delimited by a circle arc and a circle chord. A circle arc is understood to mean a connected subset of a circle. In this case, the word circle does not denote the enclosed circular surface, but rather the circle edge, which is also referred to as the circumference or circle perimeter. The line connecting two points on the circumference is referred to as the chord. Therefore, a portion of the housing, the base surface of which corresponds to the predetermined circle segment, is cut out between the two cylinder surfaces arranged at a specific distance from the top and base surface of the housing. The socket is arranged in the housing in the region of this recess perpendicular to the cylinder surfaces and the top and base surfaces. The distance between the corresponding cylinder surface and the top and base surface may at most be one half of the difference between the total height of the cylinder and the height of the socket. On account of the above-described embodiments of the housing of the socket device, which housing thus comprises cylindrical edge regions either side of the socket, the housing can be manually moved in a particularly simple manner, in particular between the at least two positions and the intermediate position of the housing.

Alternatively and in some embodiments, it is also possible for the recess to extend over the entire cylinder height and thus for the housing to comprise no circular top and base surface. In this case, the top and base surface of the housing correspond to circle surfaces having a predetermined circle segment cut out thereof.

In other embodiments, the housing is enclosed by two holders that may be mounted on a separating wall. The housing having the socket is therefore surrounded on two sides by securing elements, by means of which the housing may be secured to the separating wall of the motor vehicle. These holders, in conjunction with the mount of the socket device, also make it possible for the housing to be rotated about the axis of rotation, it not being necessary for the mount to be directly connected to the separating wall of the motor vehicle. In order to install the socket device in a separating wall in a motor vehicle, only one corresponding large recess needs to be provided in said separating wall. The socket device itself comprises the housing having the socket, mount and holding means, and therefore the socket device may be installed as a finished component in the separating wall of a motor vehicle in a particularly simple manner.

In other embodiments, the housing is designed as a prism having a triangular base surface, such that the axis of rotation of the housing extends along an edge of the prism perpendicular to the base surfaces and the socket is arranged opposite the axis of rotation on a side surface of the housing. The socket device may therefore also be integrated into the separating wall of the motor vehicle in the manner of a fold-out holder having a socket. In these embodiments, the housing of the socket device is in the shape of a prism. Said prism comprises triangles as base surfaces, the socket itself being arranged on one of the side surfaces of the prism, i.e. on one of the quadrangular side surfaces of the prism. The mount of said socket device is arranged such that the axis of rotation of the housing extends along an edge of the prism that extends perpendicularly to the triangular base surfaces. By rotating the housing about the axis of rotation, the side surface of the housing opposite the axis of rotation is swung out of the separating wall or over to the other side of the separating wall. The side surface, which can move from one side of the separating wall to the other side of the separating wall in this manner, comprises the socket of the socket device. By virtue of this housing embodiment, which is also particularly convenient to use, it is again possible to provide a socket device that is accessible from two sides of the separating wall of a motor vehicle if the socket device is arranged in the separating wall of the motor vehicle.

According to another exemplary aspect, a motor vehicle comprising a socket device of the like described above is provided, the socket device being arranged on a separating wall of the motor vehicle. Said motor vehicle comprises a separating wall, which contains a recess for a socket device such that the socket device can be arranged on said separating wall. The socket device can therefore be used from both sides of the separating wall.

In another embodiment of the motor vehicle, the separating wall separates a passenger space and a cargo space from one another or it is an outer wall of the motor vehicle. The socket device may therefore be used in a motor vehicle in which, on account of the separating wall, the region in which a driver and possibly a passenger are located is separated from a rear vehicle region, the cargo space. The rear vehicle portion, i.e., the cargo space, could also be another passenger space separated from the main passenger space and therefore the motor vehicle could for example be a taxi or a limousine.

Furthermore, the socket device does not have to be integrated in a separating wall in the vehicle interior, but rather may also be arranged in an outer wall of the motor vehicle. This application is useful for a camper van (RV), or caravan, for example, as in this case electrical devices can be used with the socket device both inside the vehicle and outside the vehicle, for example on a campsite. In order to sensibly realize the use of the socket device in an outer wall of a motor vehicle, the socket device is designed such that it is water- and weatherproof and is therefore not damaged in the event of rain, snow or other weather conditions. The socket device can therefore always be arranged at points in a motor vehicle at which it is useful to be able to access a socket device from both sides of the corresponding wall.

Embodiments of the method according to the first aspect are possible that have features according to what has been described in conjunction with the motor vehicle and vice versa. For this reason, the corresponding embodiments are not again described.

In the following, further exemplary embodiments are described.

In the exemplary embodiments, the described components of the embodiments each represent individual features that are to be considered independent of one another, in the combination as shown or described, and in combinations other than shown or described. In addition, the described embodiments can also be supplemented by other features of the invention than those described.

Elements having the same functions are in each case provided with the same reference signs in the FIGS.

Figure 1A:
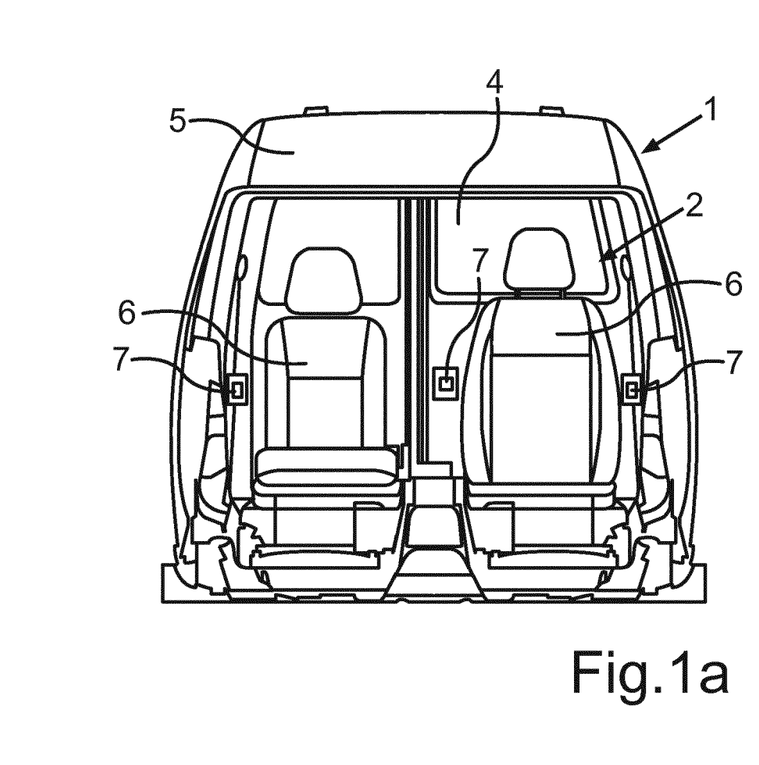
FIG. 1a is a schematic exemplary representation of various positions for arranging a socket device in a passenger space of a motor vehicle.
Figure 1B:
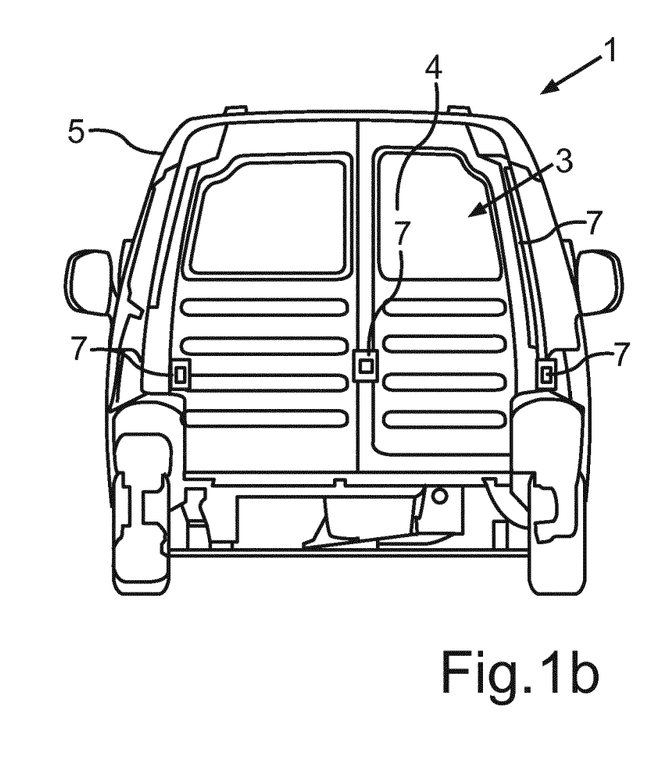
FIG. 1b is a schematic exemplary representation of various positions of a socket device in a cargo space of a motor vehicle.

Two views of a motor vehicle 1 are sketched in FIGS. 1a and 1b. The interior of the motor vehicle 1 in the passenger space 2 region is sketched in FIG. 1a. Whereas the interior of the motor vehicle 1 in the cargo space 3 region is sketched in FIG. 1b. The passenger space 2 and the cargo space 3 are separated from one another by a separating wall 4. The outer wall 5 of the motor vehicle 1 as well as two seats 6 in the passenger space 2 region are also sketched in FIGS. 1a and 1b. Three possible arrangement positions for a socket device 7 are sketched in FIGS. 1a and 1b. The socket device 7 can either be fitted in one of the two regions in the separating wall 4 between one of the seats 6 and the outer wall 5 of the motor vehicle 1 or approximately in the middle of the separating wall 4 between the two seats 6. By virtue of these three possible arrangement positions of the socket device 7, the socket device 7 can be arranged in the separating wall 4 such that it is accessible either from the driver's seat or passenger seat only or from both seats 6.

Figure 2:
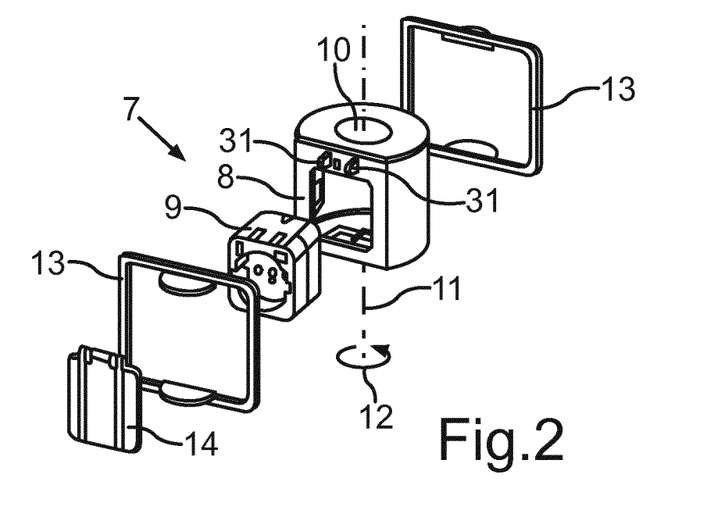
FIG. 2 is a schematic exploded representation of a socket device according to an embodiment.

In FIG. 2, the socket device 7 is sketched in an exploded representation. The socket device 7 comprises a housing 8, in which a socket 9 for receiving a plug is arranged. The socket device 7 also comprises a mount 10. By means of the mount 10, a rotational movement of the housing 8 about an axis of rotation 11 is made possible. The housing 8 is enclosed on two sides by one holder 13 in each case. The mount 10 is mounted in these holders 13 such that the housing 8, when the socket device 7 has been installed in a separating wall 4 of a motor vehicle 1, can be rotated about the axis of rotation 11 such that the socket 9 is accessible from both sides of the separating wall 4. This rotation about the axis of rotation 11 occurs by a specific angle of rotation 12. In order to protect the socket 9, the socket device 7 also comprises a flap 14, which is secured to corresponding holding means 31 on the housing 8.

Figure 3:
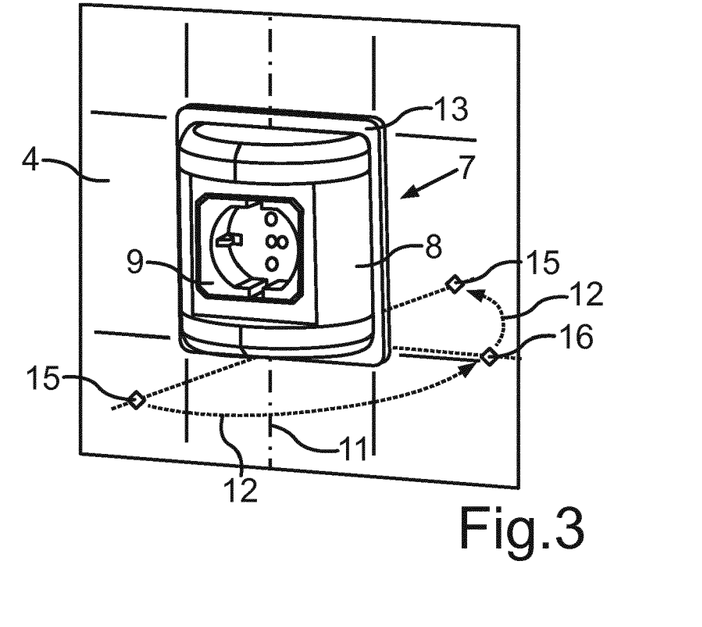
FIG. 3 is a schematic representation of various rotational positions of a socket device according to an embodiment.

A socket device 7 arranged in a separating wall 4 in a motor vehicle 1 is also sketched in FIG. 3. By rotating the housing 8 about the axis of rotation 11, the housing 8 can be rotated by a total of 180 degrees. As a result, it is possible for the housing 8 to adopt a socket position 15 in the passenger space 2 and, at 180 degrees therefrom, a second socket position 15 in the cargo space 3 of the motor vehicle 1. In addition, the housing 8 can adopt an intermediate position 16, which is arranged at an angle of 90 degrees to each of the two socket positions 15. In this intermediate position 16, the socket 9 is neither accessible from the passenger space 2 nor from the cargo space 3. The intermediate position 16 therefore serves as a kind of protective position in which, in the case of a socket device 7 without a flap 14, the socket 9 is protected from dirt or is protected in potentially hazardous situations, such as that of objects in the cargo space 3 or passenger space 2 striking the socket device 7 during travel of the motor vehicle 1.

Figure 4:
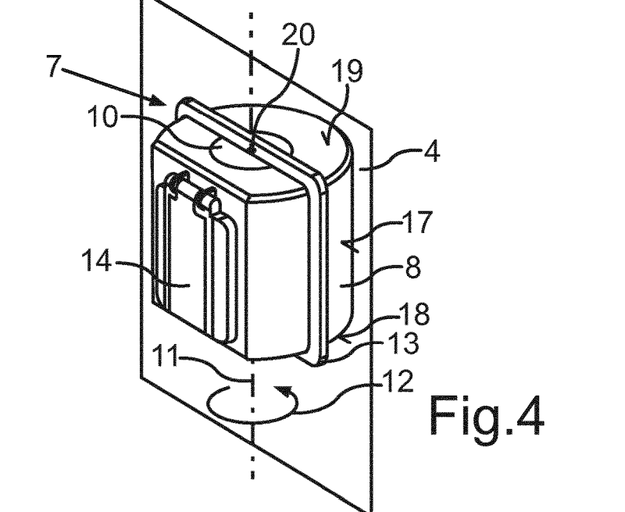
FIG. 4 is a schematic representation of a socket device having a cap according to an embodiment.

A socket device 7 comprising a flap 14 is again sketched in FIG. 4. The housing 8 of the socket device 7 is designed as a straight circular cylinder and such that the axis of rotation 11 of the housing 8 is arranged in parallel with the lateral cylinder surface 17. The axis of rotation 11 additionally extends through the respective center points 20 of the base surface 18 and top surface 19 of the cylindrical housing 8. The housing 8 can be rotated about said axis of rotation 11 by an angle of rotation 12 of approximately 180 degrees in total by means of the mount 10. The socket device 7 may therefore comprise a housing 8 in which the socket 9 is integrated and which is designed in the form of a rotary cylinder.

Figure 5:
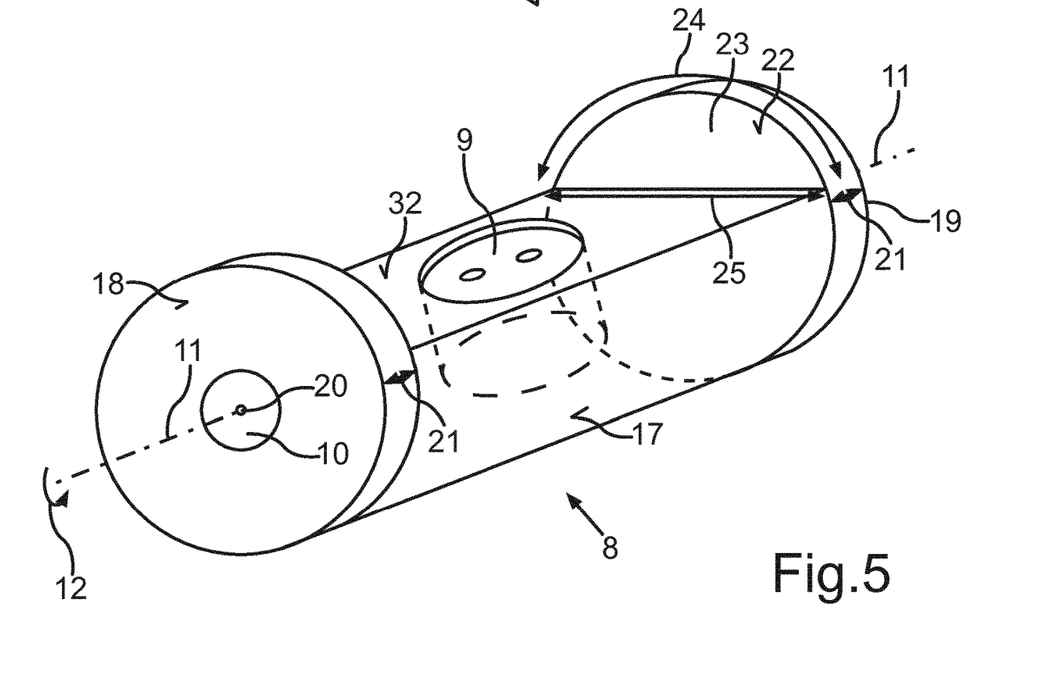
FIG. 5 is a schematic representation of a housing of a socket device according to an embodiment.

An alternative design for a housing 8 for a socket device 7 is sketched in FIG. 5. In this FIG., the cylindrical housing 8 comprises a recess in which the socket 9 is arranged. This recess is delimited at the sides by two cylinder surfaces 22. These two cylinder surfaces 22 are arranged in parallel with the base surface 18 and top surface 19 of the housing 8. The distance 21 between the cylinder surfaces 22 and the base surface 18 and top surface 19 can be at most one half of the difference between the total height of the housing 8 and the height of the socket. In order to obtain the recess in the housing 8, a body delimited by two surfaces, which in each case correspond to a circle segment 23, was cut out of the housing 8. This circle segment 23 has a predetermined circle arc 24 and a predetermined circle chord 25. Therefore, a portion of the cylindrical housing 8, the two surfaces of which portion correspond to the circle segments 23, was cut out of the housing 8 over a predetermined height that corresponds to the distance between the two cylinder surfaces 22 in order to arrange the socket 9 on the resulting flat cylinder upper surface 32.

Figure 6:
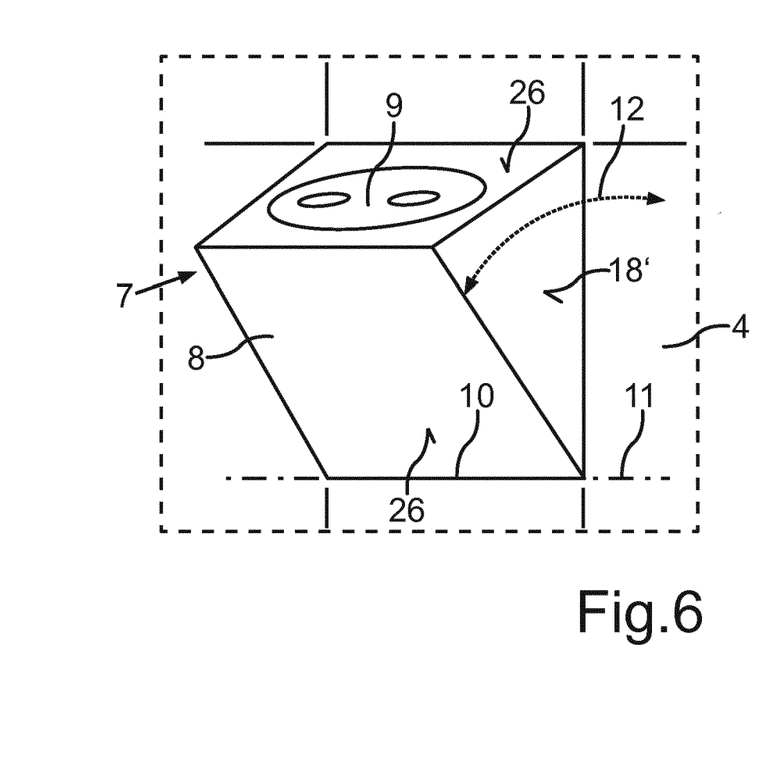
FIG. 6 is a schematic representation of a socket device having a housing designed as a prism according to an embodiment.

Another possible socket device 7 for a motor vehicle 1 is sketched in FIG. 6. The housing 8 of this socket device 7 is in the shape of a prism having triangular base surfaces 18'. The axis of rotation 11 about which this housing 8 can be rotated by an angle of rotation 12 stands vertically on the quadrangular side surfaces 26 of the housing 8 and extends along one of the edges of the prism. The socket 9 of the socket device 7 is located on the side surface 26 of the housing 8 that is arranged opposite said axis of rotation 11. The socket device 7 can therefore be folded out of the separating wall 4 in which it is secured in the manner of a rocker switch and is therefore also accessible from both sides of the separating wall 4. However, the maximum angle of rotation 12 for this socket device 7 is less than 180 degrees and is therefore smaller than the maximum angle of rotation 12 for the socket devices 7 sketched in FIGS. 2 to 5.

Figure 7:
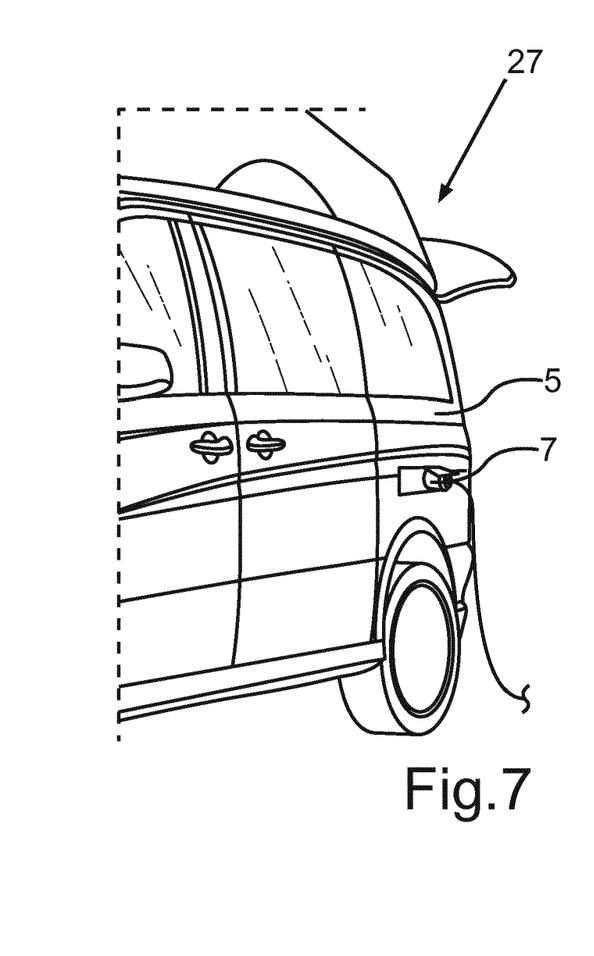
FIG. 7 is a schematic representation of a socket device for a camper van according to an embodiment.

A camper van 27 that also comprises a socket device 7 in its outer wall 5 is sketched in FIG. 7. The socket device 7 therefore does not have to be arranged on a separating wall 4 in a vehicle interior, but rather may also be arranged on an outer wall 5 of a motor vehicle 1. However, in the case of a socket device 7 of this kind for a camper van 27, it must be ensured that the socket 9 is reliably protected from meteorological influences, such as rain or snow, by means of a flap 14 and therefore that the socket device 7 as a whole is suitable for outdoor use.

Figure 8A:
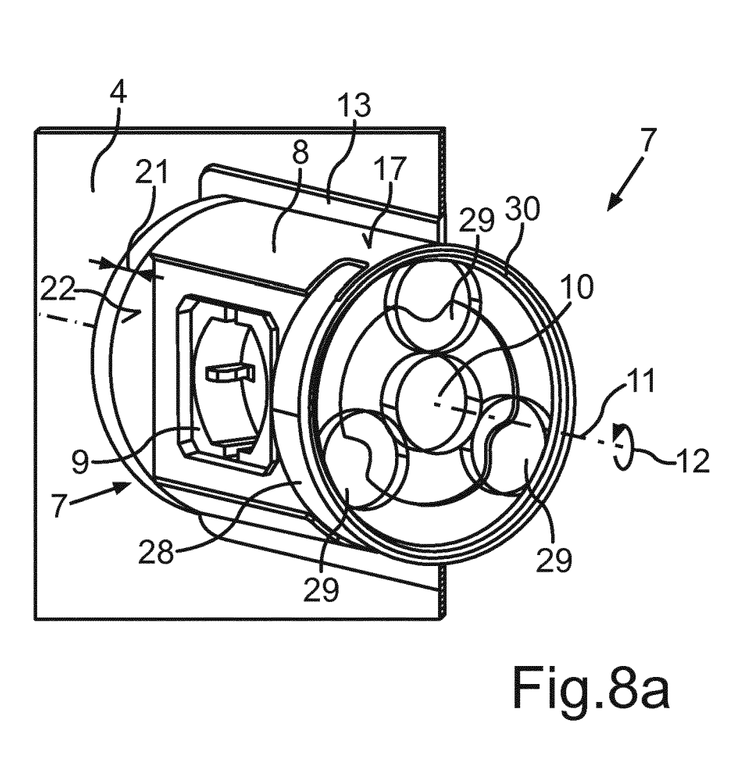
FIG. 8a is a schematic representation of a socket device having a cylindrical housing comprising an adjustment wheel according to an embodiment.
Figure 8B:
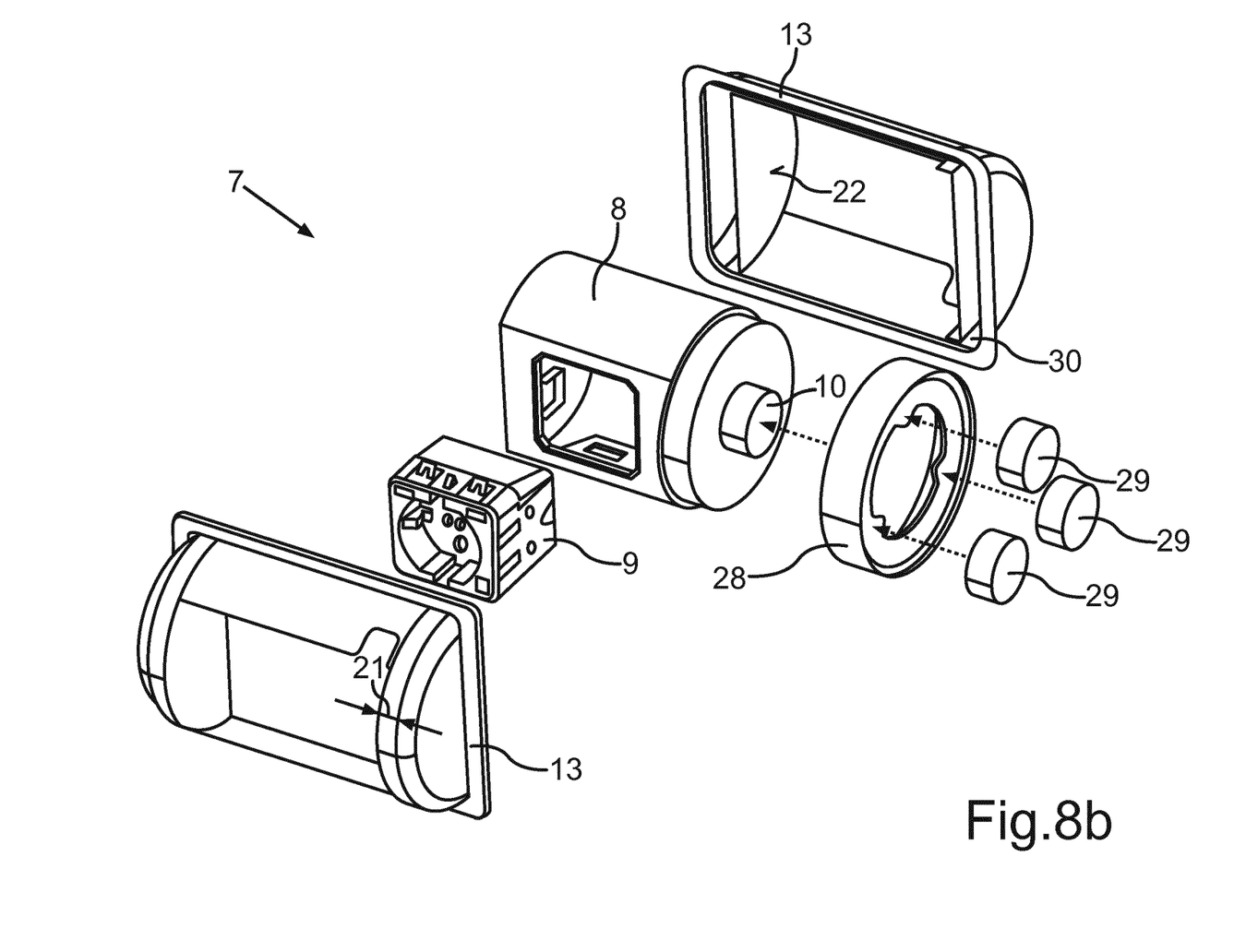
FIG. 8b is a schematic exploded representation of a socket device having a cylindrical housing comprising an adjustment wheel according to an embodiment.

A socket device 7 for a motor vehicle 1 that comprises a cylindrical housing 8 is again sketched in FIGS. 8a and 8b. This housing 8 additionally comprises edges having widths that correspond to the distance 21. An adjustment wheel 28 on which three gearwheels 29 are rigidly mounted is also integrated in the socket device 7. The gearwheels 29 are rotatably mounted such that they form a planetary transmission together with a stationary ring gear 30, which is integrated in the two holders 13. The corresponding sun wheel of the planetary transmission is formed by the mount 10 and is thus part of the housing 8. The exploded representation of this socket device 7 in FIG. 8b clearly shows that the ring gear 30 is integrated in the holders 13.

In order to produce the at least two socket positions 15 and the intermediate position 16 in a particularly simple manner by means of the adjustment wheel 28 by rotating the housing 8 on the adjustment wheel 28 about the axis of rotation 11, corresponding levers that latch in corresponding holding means of the adjustment wheel in the region of the ring gear 30 and that thus set the position can also be used with the adjustment wheel 28.

A planetary transmission a transmission ratio of i=2 is sketched in FIGS. 8a and 8b. This transmission ratio produces a reduction ratio and thus a transmission ratio for a faster movement of the socket compared with a manual rotary movement of the adjustment wheel 28. This reduction ratio was selected such that the housing 8 of the socket device 7 can be manually moved in a particularly user-friendly manner.

The cable duct behind the socket 9 in the housing 8 (not shown in FIGS. 8a and 8b) is designed such that the cable has a specific excess length, as a result of which rotations of the housing 8 together with the socket 9 up to a total of 180 degrees are possible. Therefore, no sliding contacts are required for bringing about the rotation of the housing.

As an alternative to the socket devices 7 shown here, the socket device 7 may be arranged on the separating wall 4 or outer wall 5 of the motor vehicle 1 or camper van 27 in a manner rotated by 90 degrees or another angle.

Various country variants are possible when choosing the socket 9. The plug may be designed as a plug of type A or B, as is common for example in the USA, Canada or Mexico, type F, as is common in many European countries, type G, as is common for example in Great Britain, type I, as is common in Australia and New Zealand, or as another plug type. As an alternative to the 230 volt mains voltage that is common in Europe, other mains voltages are conceivable for the socket 9, for example 100, 115, 120, 127, 200, 220 or 240 volts.

Overall, the examples show how relatively simple technical means can be used to construct a socket device 7 for a motor vehicle 1 that comprises a housing 8 as well as a socket 9 and that can be mounted in a separating wall 4 or outer wall 5 of a motor vehicle 1 or camper van 27 by means of a mount 10 such that the socket 9 can be rotated by means of a corresponding rotation about an axis of rotation 11. As a result, the socket 9 is accessible from both sides of the separating wall 4 or outer wall 5 and therefore from a passenger space 2 and a cargo space 3, for example.

LIST OF REFERENCE NUMERALS

1 Motor vehicle
2 Passenger space
3 Cargo space
4 Separating wall
5 Outer wall
6 Seat
7 Socket device
8 Housing
9 Socket 10 Mount
11 Axis of rotation
12 Angle of rotation
13 Holder
14 Flap
15 Socket position
16 Intermediate position
17 Lateral cylinder surface
18 Base surface
18' Base surface
19 Top surface
20 Center point
21 Distance
22 Cylinder surface
23 Circle segment
24 Circle arc
25 Circle chord
26 Side surface
27 Camper van
28 Adjustment wheel
29 Gearwheel
30 Ring gear
31 Holding means
32 Cylinder upper surface The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A socket device for a motor vehicle, comprising a socket arranged in a housing for receiving a plug, comprising a mount, using which the housing can be mounted at least indirectly on a separating wall of the motor vehicle so as to be able to rotate about an axis of rotation, such that the socket is accessible from both sides of the separating wall of the motor vehicle by rotating the housing; wherein
the housing comprises a straight circular cylinder such that the axis of rotation of the housing extends in parallel with a lateral cylinder surface through respective center points of a top and base surface of the circular cylinder.

2. The socket device of claim 1, wherein the housing is rotatable about the axis of rotation into a predetermined intermediate position, in which the socket is accessible from neither of the two sides of the separating wall.

3. The socket device of claim 1, wherein the housing is enclosed by two holders that can be mounted on the separating wall.

4. A motor vehicle comprising a socket device according to claim 1, wherein the socket device is arranged on a separating wall of the motor vehicle.

5. The motor vehicle of claim 4, wherein the separating wall separates a passenger space and a cargo space from one another or it is an outer wall of the motor vehicle.

6. The socket device of claim 1, wherein the socket is designed to supply an electrical voltage of 100, 115, 120, 127, 200, 220, 230 or 240 volts.

7. The socket device of claim 6, wherein the housing is rotatable about the axis of rotation into at least two predetermined positions.

8. The socket device of claim 6, wherein the housing is rotatable about the axis of rotation into a predetermined intermediate position, in which the socket is accessible from neither of the two sides of the separating wall.

9. The socket device of claim 1, wherein the housing is rotatable about the axis of rotation into at least two predetermined positions.

10. The socket device of claim 9, wherein the housing is rotatable about the axis of rotation into a predetermined intermediate position, in which the socket is accessible from neither of the two sides of the separating wall.

11. The socket device of claim 1, wherein a predetermined circle segment having a predetermined circle arc and a predetermined circle chord is cut out at each of two cylinder surfaces arranged at a predetermined distance parallel to the top and base surface of the housing, such that the housing comprises a recess between the two cylinder surfaces, on which recess the socket is arranged in the housing.

12. The socket device of claim 11, wherein the housing is enclosed by two holders that can be mounted on the separating wall.

13. A socket device for a motor vehicle, comprising a socket arranged in a housing for receiving a plug, comprising a mount, using which the housing can be mounted at least indirectly on a separating wall of the motor vehicle for rotation about an axis of rotation, such that the socket is accessible from both sides of the separating wall by rotating the housing; wherein
the housing comprises a straight circular cylinder such that the axis of rotation of the housing extends in parallel with a lateral cylinder surface through respective center points of a top and base surface of the circular cylinder; and wherein
a predetermined circle segment having a predetermined circle arc and a predetermined circle chord is cut out at each of two cylinder surfaces arranged at a predetermined distance parallel to the top and base surface of the housing, such that the housing comprises a recess between the two cylinder surfaces, in which recess the socket is arranged.

14. The socket device of claim 13, wherein the housing is enclosed by two holders that can be mounted on the separating wall.

15. A motor vehicle comprising a socket device, wherein the socket device is arranged on a separating wall of the motor vehicle and wherein the socket device comprises a socket arranged in a housing for receiving a plug, comprising a mount, using which the housing is rotatably arranged on the separating wall of the motor vehicle, such that the socket is accessible from both sides of the separating wall by rotating the housing; wherein
the housing comprises a straight circular cylinder such that an axis of rotation of the housing extends in parallel with a lateral cylinder surface through respective center points of a top and base surface of the circular cylinder; and wherein
a predetermined circle segment having a predetermined circle arc and a predetermined circle chord is cut out at each of two cylinder surfaces arranged at a predetermined distance parallel to the top and base surface of the housing, such that the housing comprises a recess between the two cylinder surfaces, in which recess the socket is arranged.

* * * * *